(12) United States Patent
Kosaka

(10) Patent No.: US 9,354,106 B2
(45) Date of Patent: May 31, 2016

(54) COMBINATION WEIGHER WITH DISCHARGE TIMINGS BASED ON CONVEYING LENGTH

(75) Inventor: Taichi Kosaka, Hyogo (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 215 days.

(21) Appl. No.: 13/983,041

(22) PCT Filed: Jun. 2, 2011

(86) PCT No.: PCT/JP2011/003116
§ 371 (c)(1),
(2), (4) Date: Oct. 16, 2013

(87) PCT Pub. No.: WO2012/104931
PCT Pub. Date: Aug. 9, 2012

(65) Prior Publication Data
US 2014/0027187 A1  Jan. 30, 2014

(30) Foreign Application Priority Data
Feb. 1, 2011 (JP) ................................ 2011-019844

(51) Int. Cl.
*G01G 13/16* (2006.01)
*G01G 19/393* (2006.01)
*G01G 19/387* (2006.01)

(52) U.S. Cl.
CPC .............. *G01G 19/387* (2013.01); *G01G 13/16* (2013.01); *G01G 19/393* (2013.01)

(58) Field of Classification Search
CPC .... G01G 19/387; G01G 19/393; G01G 13/16
USPC ........................................ 177/25.18, 119, 145
See application file for complete search history.

(56) References Cited

U.S. PATENT DOCUMENTS

| 4,442,910 A | 4/1984 | Mikami |
| 4,467,880 A | 8/1984 | Minamida et al. |

(Continued)

FOREIGN PATENT DOCUMENTS

| JP | 57-8530 U | 1/1982 |
| JP | 2005-315579 A | 11/2005 |

(Continued)

OTHER PUBLICATIONS

Extended European Search Report for EP 11 85 7669, dated Oct. 22, 2014.

(Continued)

*Primary Examiner* — Randy W Gibson
(74) *Attorney, Agent, or Firm* — Marshall, Gerstein & Borun LLP

(57) ABSTRACT

A combination weigher includes a collecting conveyor, a plurality of weighing conveyors, a control section which finds one combination of the weighing conveyors in which a total weight of the objects falls within a target weight range, and a manipulation setting display device which pre-inputs a desired value of a conveying length of the objects, and the control section finds start timings of conveying operation of the weighing conveyors selected to make up the discharge combination such that the conveying length of the objects becomes the desired value pre-input by the input unit and the objects discharged from the weighing conveyors selected to make up the discharge combination are at different positions on the collecting conveyor, and causes the weighing conveyors to start the conveying operation at the found timings.

8 Claims, 6 Drawing Sheets

(56) References Cited

U.S. PATENT DOCUMENTS

| | | | |
|---|---|---|---|
| 4,720,961 A * | 1/1988 | Jordan | 53/502 |
| 4,821,820 A * | 4/1989 | Edwards et al. | 177/25.18 |
| 5,258,580 A * | 11/1993 | Bergholt | 177/25.18 |
| 5,596,179 A | 1/1997 | Sakaeda | |
| 7,279,644 B1 * | 10/2007 | Kasel | 177/25.13 |
| 9,079,721 B2 * | 7/2015 | Kawanishi et al. | |
| 2014/0027186 A1 * | 1/2014 | Kawashima | 177/25.18 |

FOREIGN PATENT DOCUMENTS

| | | |
|---|---|---|
| JP | 2006-194722 A | 7/2006 |
| JP | 2006-214784 A | 8/2006 |
| WO | WO-93/23724 A1 | 11/1993 |

OTHER PUBLICATIONS

International Search Report for PCT/JP2011/003116, mailed Jun. 28, 2011.

* cited by examiner

COMBINATION WEIGHER WITH DISCHARGE TIMINGS BASED ON CONVEYING LENGTH

TECHNICAL FIELD

The present invention relates to a combination weigher which finds a combination in which a total weight of objects falls within a predetermined target weight range.

BACKGROUND ART

Combination weighers are roughly classified into an automatic combination weigher, a semiautomatic combination weigher and a hand-operated (manual) combination weigher, depending on a difference in a feeding method and a discharge method of objects with respect to a weighing unit. In the hand-operated combination weigher, feeding and discharging of the objects are performed manually by an operator. In the semiautomatic combination weigher, feeding of the objects is performed manually by the operator, while discharging of the objects is performed automatically (see e.g., Patent Literature 1). In the automatic combination weigher, feeding and discharging of the objects are performed automatically (mechanic control) (see e.g., Patent Literature 2). For the objects which are incapable of being fed automatically to a combination weigher or the objects which are not suitable for use in the automatic feeding, the hand-operated combination weigher or the semiautomatic combination weigher is used.

In a conventional combination weigher, for example, a plurality of hoppers are aligned in one line or two lines, and a single belt conveyor is placed under the plurality of hoppers. When an operator feeds the objects to the hoppers, the objects are weighed, discharge gates of the hoppers selected to make up a combination in which a combination weight falls within a predetermined weight range are opened and closed to discharge the objects, the objects discharged from the hoppers are conveyed in one direction by a belt conveyor, and the objects are discharged to a subsequent-stage apparatus, such as a packaging machine.

This subsequent-stage apparatus includes, for example, a receiver funnel which receives the objects discharged from the belt conveyor of the combination weigher and feeds the objects into a bag, a tray, etc. This receiver funnel is placed in close proximity to a discharge end of the belt conveyor.

CITATION LIST

Patent Literature

Patent Literature 1: Japanese Laid-Open Patent Application Publication No. 2006-214784
Patent Literature 2: Japanese Laid-Open Patent Application Publication No. Sho. 58-41324

SUMMARY OF INVENTION

Technical Problem

In the above stated conventional combination weigher, for example, in a case where a plurality of hoppers selected to make up a combination are hoppers which are closer to each other, the objects are discharged from the belt conveyor in a state in which the objects corresponding to the plurality of hoppers are lumped together, so that the objects may get stuck in the receiver funnel of the subsequent-stage apparatus.

In the conventional combination weigher, the objects are discharged from the hoppers selected to make up a combination onto the belt conveyor, and conveyed thereon. Since the belt conveyor conveys the objects in a direction in which the hoppers are aligned, the hoppers are placed at a location which is much higher than the belt conveyor to prevent the objects being conveyed from contacting the hoppers. Because of this, a great impact is generated when the objects are dropped from the hoppers onto the belt conveyor. In view of this, the conventional combination weigher is not suitable for use in weighing of the objects which are broken or damaged easily. For example, if objects such as mushrooms having caps are dropped from the hoppers onto the belt conveyor, the caps are damaged easily, so that their commercial value will degrade or the damaged objects will be unsalable products.

An operator must take care so that the objects do not get stuck in the discharge gates of the hoppers. An inexperienced operator or the like may feed the objects to the hoppers at an incorrect timing, which will result in, for example, a problem that the objects get stuck in the discharge gates of the hoppers. Thus, the operator who manipulates the conventional semiautomatic combination weigher is required to be trained, experienced, etc.

The present invention has been made to solve the above described problems, and an object of the present invention to provide a combination weigher which is capable of discharging the objects such that they are suitably apart from each other, without causing a state in which the objects are lumped together, to prevent the objects from getting stuck in the receiver funnel of the objects in the subsequent-stage apparatus. Another object of the present invention is to provide a combination weigher which is capable of preventing damages to the objects which are broken or damaged easily, due to an impact or the like generated when they are dropped.

Solution to Problem

To achieve the above described object, a combination weigher according to a first aspect of the present invention comprises a collecting conveyor which conveys objects fed thereto at a predetermined speed in one direction and discharges the objects; a plurality of object holding units which hold the objects fed thereto for a specified time, then discharge the objects from discharge ports and feeds the objects to the collecting conveyor in an activated state in which the objects are conveyed, in which the discharge ports are placed at predetermined positions in a conveying direction of the collecting conveyor; a combination unit which finds one discharge combination including a combination of the object holding units holding the objects in which a total weight of the objects falls within a target weight range; an input unit which pre-inputs a desired value of a conveying length of the objects which is a length from the objects at a head to the objects at a tail in a state in which the objects discharged from the object holding units selected to make up the discharge combination are conveyed by the collecting conveyor; a processor unit which finds start timings of discharge operation of the objects of the object holding units selected to make up the discharge combination based on the positions of the discharge ports of the object holding units selected to make up the discharge combination and the conveying speed of the collecting conveyor such that the conveying length of the objects becomes the desired value pre-input by the input unit and the objects discharged from the discharge ports of the object holding units selected to make up the discharge combination are at different positions on the collecting conveyor, when the objects are conveyed by the collecting conveyor; and a control unit which causes the object holding units selected to make up the discharge combination to start the discharge operation of the objects based on the start timings of the discharge operation found by the processor unit.

In accordance with this configuration, the objects discharged from the object holding units selected to make up the discharge combination are conveyed by the collecting conveyor such that the conveying length of the objects on the collecting conveyor becomes the desired value and the objects corresponding to the respective object holding units are at different positions on the collecting conveyor. Therefore, the objects can be discharged from the collecting conveyor in a state in which the objects corresponding to one object holding unit are suitably apart from the objects corresponding to another object holding unit and these objects are not lumped together. As a result, it becomes possible to prevent a situation in which the objects get stuck in a receiver inlet of the objects in a subsequent-stage apparatus of the combination weigher.

The processor unit may find the start timings of the discharge operation of the objects of the object holding units selected to make up the discharge combination such that the conveying length of the objects becomes the desired value pre-input by the input unit, and the objects discharged from the discharge ports of the object holding units selected to make up the discharge combination are placed with their centers being arranged at uniform intervals on the collecting conveyor, when the objects are conveyed by the collecting conveyor.

In accordance with this configuration, the objects discharged from the object holding units selected to make up the discharge combination are conveyed by the collecting conveyor such that the conveying length of the objects on the collecting conveyor becomes the desired value and the objects are placed with their centers being arranged at uniform intervals on the collecting conveyor. Therefore, the objects can be discharged from the collecting conveyor in a state in which the centers of the objects are suitably apart at uniform intervals (distances) and the objects are not lumped together. As a result, it becomes possible to prevent a situation in which the objects get stuck in the receiver inlet of the objects in the subsequent-stage apparatus of the combination weigher.

A combination weigher according to another aspect of the present invention described below is an example in which weighing conveyors are used as the object holding units, and a weighing conveyor control unit is used as the control unit, in the combination weigher according to the above stated aspect of the present invention.

According to another aspect of the present invention, a combination weigher comprise a collecting conveyor which conveys objects fed thereto at a predetermined speed in one direction and discharges the objects; a plurality of weighing conveyors which are fed with the objects manually in a deactivated state in which the objects are not conveyed, convey the objects, discharge the objects from discharge ends thereof and feed the objects to the collecting conveyor in an activated state in which the objects are conveyed, in which the discharge ends are placed at predetermined positions in a conveying direction of the collecting conveyor; a plurality of weight sensors provided to correspond to the weighing conveyors, respectively, to measure weights of the objects held on the weighing conveyors; a combination unit which finds one discharge combination including a combination of the weighing conveyors holding the objects in which a total weight of the objects falls within a target weight range; an input unit which pre-inputs a desired value of a conveying length of the objects which is a length from the objects at a head to the objects at a tail in a state in which the objects discharged from the weighing conveyors selected to make up the discharge combination are conveyed by the collecting conveyor; a processor unit which finds start timings of conveying operation of the weighing conveyors selected to make up the discharge combination based on the positions of the discharge ends of the weighing conveyors selected to make up the discharge combination and the conveying speed of the collecting conveyor such that the conveying length of the objects becomes the desired value pre-input by the input unit and the objects discharged from the discharge ends of the weighing conveyors selected to make up the discharge combination are at different positions on the collecting conveyor, when the objects are conveyed by the collecting conveyor; and a weighing conveyor control unit which causes the weighing conveyors selected to make up the discharge combination to start the conveying operation based on the start timings of the conveying operation found by the processor unit.

In accordance with this configuration, the objects discharged from the weighing conveyors selected to make up the discharge combination are conveyed by the collecting conveyor such that the conveying length of the objects on the collecting conveyor becomes the desired value and the objects corresponding to the respective weighing conveyors are at different positions on the collecting conveyor. Therefore, the objects can be discharged from the collecting conveyor in a state in which the objects corresponding to one weighing conveyor are suitably apart from the objects corresponding to another weighing conveyor and these objects are not lumped together. As a result, it becomes possible to prevent a situation in which the objects get stuck in the receiver inlet of the objects in the subsequent-stage apparatus of the combination weigher.

In addition, the weighing conveyors are used in the plurality of weighing units which are fed with the objects by an operator, and the objects discharged from the discharge ends of the weighing conveyors are collected on the collecting conveyor and discharged, a height (level) difference between the weighing conveyors and the collecting conveyor can be reduced, which can lessen an impact generated when the objects discharged from the weighing conveyors selected to make up the discharge combination are transferred onto the collecting conveyor. Because of this, it becomes possible to weigh the objects which are broken or damaged easily, due to an impact or the like generated when they are dropped, without causing damages to them. Since the operator has only to put the objects on the weighing conveyor in a work for feeding the objects, even an inexperienced operator can more easily feed the objects than in a case where the objects are fed to the hoppers in the conventional combination weigher.

The processor unit may find the start timings of the conveying operation of the weighing conveyors selected to make up the discharge combination such that the conveying length of the objects becomes the desired value pre-input by the input unit and the objects discharged from the discharge ends of the weighing conveyors selected to make up the discharge combination are placed with their centers being arranged at uniform intervals on the collecting conveyor, when the objects are conveyed by the collecting conveyor.

In accordance with this configuration, the objects discharged from the weighing conveyors selected to make up the discharge combination are conveyed by the collecting conveyor such that the conveying length of the objects on the collecting conveyor becomes the desired value and the objects are placed with their centers being arranged at uniform intervals on the collecting conveyor. Therefore, the objects can be discharged from the collecting conveyor in a state in which the centers of the objects are suitably apart at uniform intervals (distances) and the objects are not lumped together. As a result, it becomes possible to prevent a situation in which the objects get stuck in the receiver inlet of the objects in the subsequent-stage apparatus of the combination weigher.

The processor unit may calculate a value of the uniform intervals based on the desired value pre-input by the input unit and the number of the weighing conveyors selected to make up the discharge combination found by the combination unit.

The plurality of weighing conveyors may constitute first and second weighing conveyor groups which are placed such that the collecting conveyor is interposed between the first and second weighing conveyor groups; wherein the weighing conveyors in each of the first and second weighing conveyor groups are arranged in parallel; and the weighing conveyors in each of the first and second weighing conveyor groups may be placed such that the collecting conveyor is placed at the discharge end side of the weighing conveyors and a conveying direction of the weighing conveyors is perpendicular to the conveying direction of the collecting conveyor.

In accordance with this configuration, since the weighing conveyor groups are placed at both sides of the collecting conveyor, the length of the collecting conveyor can be reduced, and the combination weigher can be made compact. In addition, the operator can easily carry out the work for feeding the objects.

Advantageous Effects of Invention

The present invention has the above stated configuration, and has advantages that it is possible to provide a combination weigher which is capable of discharging objects such that they are suitably apart from each other, without causing a state in which the objects are lumped together, to prevent a situation in which the objects get stuck in the receiver inlet of the objects in the subsequent-stage apparatus. In addition, the present invention has advantages that it is possible to provide a combination weigher which is capable of preventing damages to objects which are broken or damaged easily, due to an impact or the like generated when they are dropped.

The above and further objects, features and advantages of the present invention will more fully be apparent from the following detailed description of preferred embodiments with accompanying drawings.

DESCRIPTION OF EMBODIMENTS

Hereinafter, a preferred embodiment of the present invention will be described with reference to the drawings. Throughout the drawings, the same or corresponding components are designated by the same reference symbols, and will not be described in repetition. The present invention is not limited to the embodiment described below.

Embodiment

Figure 1A:
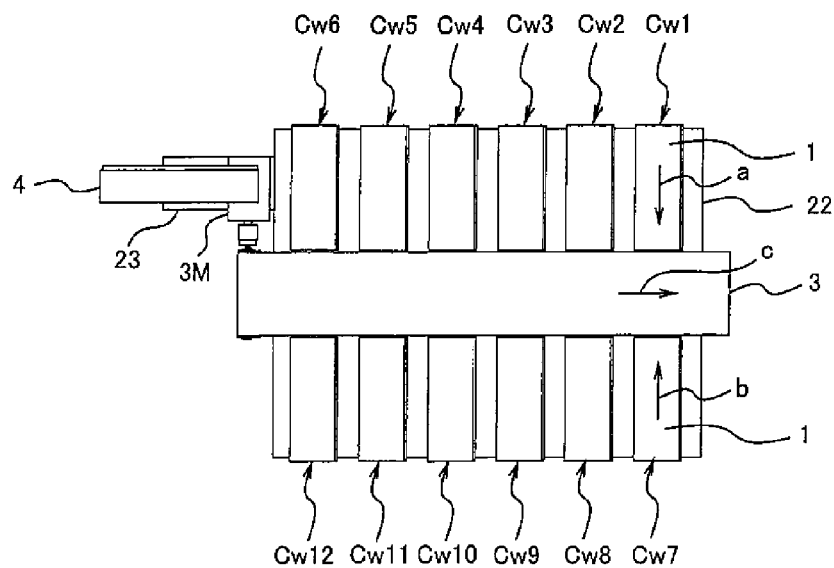
FIG. 1A is a plan view showing an exemplary combination weigher according to an embodiment of the present invention, when viewed from above.
Figure 1B:
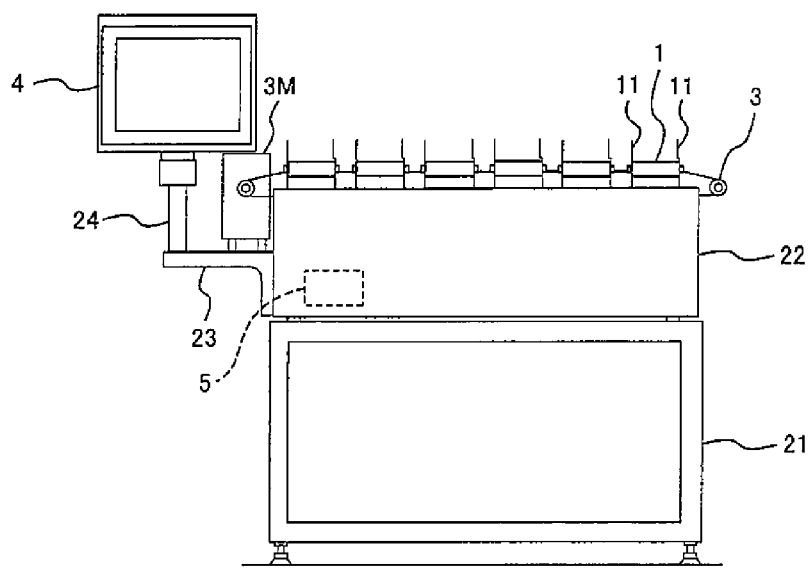
FIG. 1B is a front view of the combination weigher.
Figure 1C:
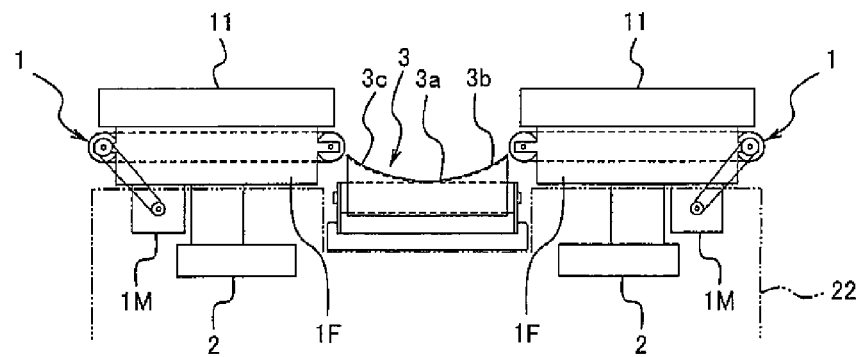
FIG. 1C is a schematic view showing a detailed structure of a weighing unit and a collecting conveyor in the combination weigher.
Figure 2:
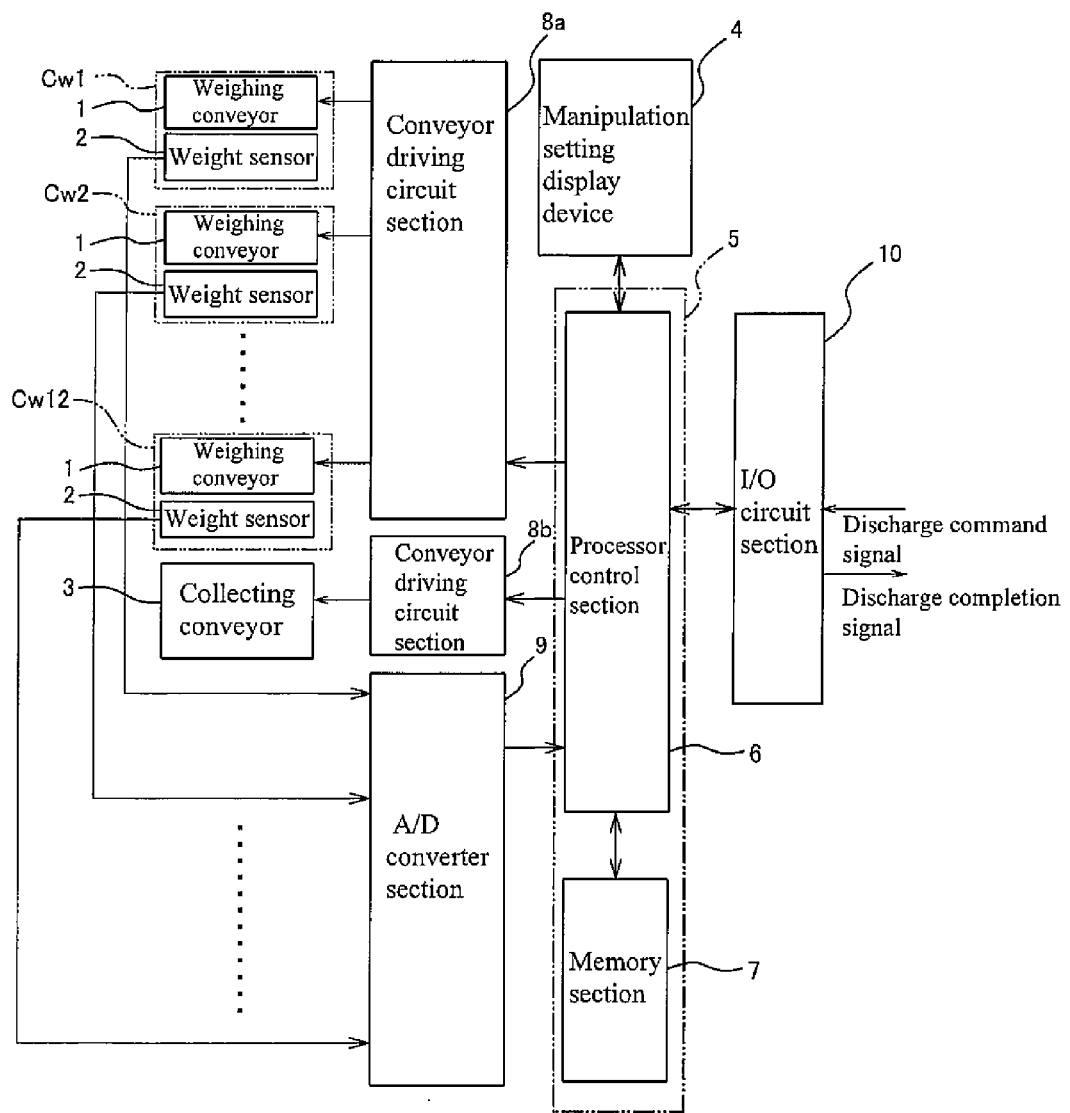
FIG. 2 is a block diagram showing a schematic configuration of the exemplary combination weigher according to the embodiment of the present invention.

FIG. 1 is a schematic view showing an external appearance of an exemplary combination weigher according to an embodiment of the present invention, in which FIG. 1A is a plan view of the combination weigher when viewed from above, FIG. 1B is a front view of the combination weigher, and FIG. 1C is a schematic view showing a detailed structure of a weighing unit and a collecting conveyor in the combination weigher. FIG. 2 is a block diagram showing a schematic configuration of the exemplary combination weigher according to the embodiment of the present invention.

This combination weigher includes a plurality of weighing units Cw1 to Cw12, a collecting conveyor 3, a manipulation setting display device 4, a controller 5, etc.

Each of the plurality of weighing units Cw1 to Cw12 includes a weighing conveyor 1 constituted by a belt conveyor, and a weight sensor 2 constituted by a load cell, or the like, supporting the weighing conveyor 1, to measure a weight of the objects put on the weighing conveyor 1. Each of the weighing conveyors 1 is provided with a pair of guide plates 11 for preventing the objects from dropping out of both sides of the weighing conveyor 1. Specifically, for example, as shown in FIG. 1C, the guide plate 11 is mounted to a conveyor frame 1F. A driving motor 1M of the weighing conveyor 1 is attached to a lower surface of the conveyor frame 1F of the weighing conveyor 1. The weight sensor 2 is fastened to a fastening member (not shown) inside of an apparatus body 22, and the conveyor frame 1F is attached to an upper portion thereof via a mounting member. That is, the weight sensor 2 supports the weighing conveyor 1 including the pair of guide plates 11 and the driving motor 1M.

A collecting conveyor 3 is placed between six weighing units Cw1 to Cw6 and six weighing units Cw7 to Cw12. The six weighing conveyors 1 of the weighing units Cw1 to Cw6 are arranged in parallel at one side of the collecting conveyor 3. The weighing conveyors 1 of the weighing units Cw1 to Cw6 are placed such that a conveying direction (direction of arrow a) of the weighing conveyors 1 is perpendicular to a conveying direction (direction of arrow c) of the collecting conveyor 3. The six weighing conveyors 1 of the weighing units Cw7 to Cw12 are arranged in parallel at the other side of the collecting conveyor 3. The weighing conveyors 1 of the weighing units Cw7 to Cw12 are placed such that a conveying direction (direction of arrow b) of the weighing conveyors 1 is perpendicular to the conveying direction of the collecting conveyor 3.

The collecting conveyor 3 is a belt conveyor in which a ring-shaped belt is rotatable, and is a trough-type belt conveyor which conveys the objects in a state in which a center portion of the belt is concave relative to both edge portions thereof. As shown in FIG. 1C, the collecting conveyor 3 is the trough-type belt conveyor configured such that the both edge portions (widthwise both end portions of the belt) 3a and 3b of an upper surface portion thereof (conveying surface) of the ring-shaped belt rotating are held up by support members (not shown), and the objects are conveyed in a state in which a center portion 3c is concave relative to the both edge portions 3a and 3b of the upper surface portion. The collecting conveyor 3 may be a belt conveyor having a flat conveying surface. In that case, guide plates such as the guide plates 11 of the conveyor 1 may be provided at both edge portions of the belt as required.

In the present embodiment, the collecting conveyor 3 conveys the objects in the direction as indicated by, for example, the arrow c. In this case, a subsequent-stage apparatus (not shown) is installed subsequently to the collecting conveyor 3 in the direction of the arrow c (right side in FIG. 1B), and the objects conveyed by the collecting conveyor 3 are fed to the subsequent-stage apparatus.

The apparatus body 22 is mounted to a platform 21. The collecting conveyor 3 is mounted onto the apparatus body 22. A support member 23 is mounted to a side portion of the apparatus body 22. The manipulation setting display device 4 is attached to the support member 23 via a support column 24. A driving motor 3M of the collecting conveyor 3 is mounted to the support member 23.

The apparatus body 22 accommodates conveyor driving circuit sections 8a and 8b, an A/D converter section 9, a control section 5, an I/O circuit section 10, etc., which are shown in FIG. 2.

Each of the weighing conveyor 1 is supported by the weight sensor 2 such as the load cell. The weight sensor 2 measures the weight of the objects on the weighing conveyor 1. The A/D converter section 9 converts a weight value (analog weight signal) measured by the weight sensor 2 into a digital signal, which is sent to the control section 5.

The control section 5 is constituted by, for example, a microcontroller, etc. The control section 5 includes a processor control section 6 including a CPU or the like, and a memory section 7 including a RAM, a ROM, etc. Running programs, data of operation parameters, weight data, etc., are stored in the memory section 7. A combination unit, a processor unit for finding activation timings (start timings of conveying operation) of the weighing conveyors 1, a weighing conveyor control unit, and a collecting conveyor control unit, are constituted by the control section 5. The control section 5 may be constituted by a single controller for executing centralized control, or by a plurality of controllers cooperating with each other to execute decentralized control.

In the control section 5, the processor control section 6 executes the running programs stored in the memory section 7 to control the overall combination weigher, and performs a combination process, etc., as will be described later. For example, the control section 5 continuously obtains the weight value measured by the weight sensor 2 attached with the weighing conveyor 1 as a digital value via the A/D converter section 9, and stores the digital value in the memory section 7 as necessary. The control section 5 causes the conveyor driving circuit section 8a to control a driving operation of each weighing conveyor 1, and causes the conveyor driving circuit section 8b to control a driving operation of the collecting conveyor 3. The control section 5 receives a discharge command signal from the subsequent-stage apparatus (not shown), and outputs a discharge completion signal to the subsequent-stage apparatus, via the I/O circuit section 10. The control section 5 receives a signal from the manipulation setting display device 4, and outputs a signal such as data to be displayed, to the manipulation setting display device 4.

The combination process performed by the control section 5 will be described. In this combination process, the control section 5 performs combination calculation based on the weights of the objects on the weighing conveyors 1 which are obtained from the weight values of the weight sensors 2, finds all combinations in which total weights (combination weights) of the objects held in the weighing conveyors 1 fall within a target weight range (allowable range with respect to a combination target weight), and determines one combination as a discharge combination. If there exist plural combinations in which total weights fall within the target weight range, the control section 5 determines a combination in which an absolute value of a difference between its combination weight and the combination target weight is smallest as the discharge combination. The objects on the weighing conveyors 1 selected to make up the discharge combination are conveyed by the weighing conveyors 1, and are discharged onto the collecting conveyor 3.

The manipulation setting display device 4 includes, for example, a touch-screen type display screen. The manipulation setting display device 4 includes a manipulation unit by which the operator can perform manipulation of starting, stopping, etc., of running of the combination weigher, an input unit by which the operator performs setting or the like of operation parameters of the combination weigher, and a display unit which displays a result (combination weight, etc.) of the combination process performed by the manipulation unit, the input unit and the control section 5, on the screen of the display.

Figure 3:
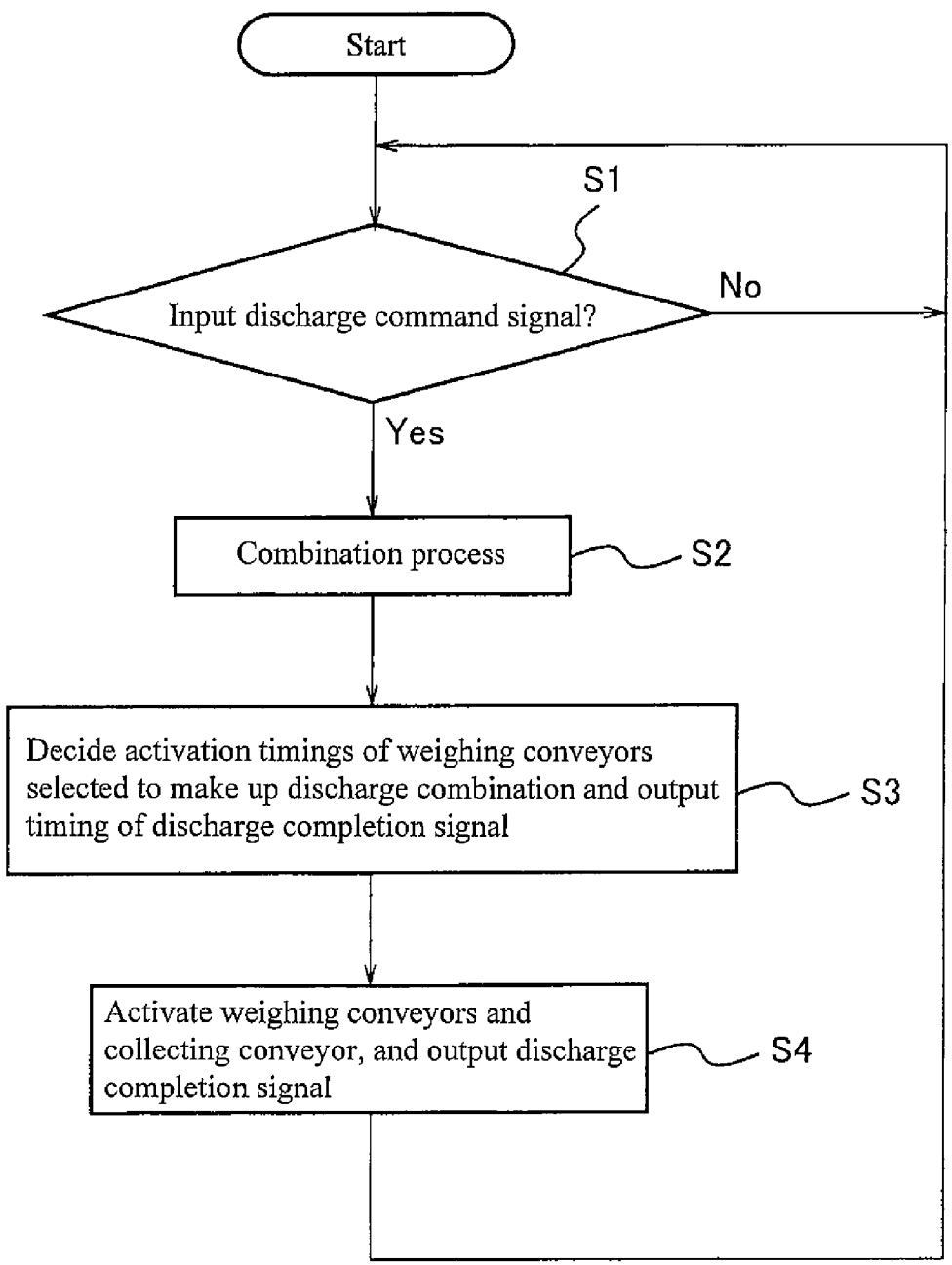
FIG. 3 is a flow chart showing an exemplary operation of the exemplary combination weigher according to the embodiment of the present invention.

An operation of the combination weigher of the present embodiment configured as described above will be described. FIG. 3 is a flow chart showing an exemplary operation of the exemplary combination weigher according to the embodiment. The operation of the combination weigher is implemented by the process executed by the control section 5. Information required to control the operation of the combination weigher, etc., are all stored in the memory section 7. The objects are, for example, an agricultural product. For example, the objects are mushroom such as eryngii mushroom.

The operator feeds (puts) the objects onto the weighing conveyor 1, for example, one by one, on which there are no objects, in a deactivated state in which the objects are not conveyed. Although not shown, the control section 5 obtains the weight values of the weight sensors 2 at specified time intervals from the A/D converter section 9, and knows the weighing conveyors 1 holding the objects and the weight values of the objects of the weighing conveyors 1 based on the weight values of the weight sensors 2. When the control section 5 knows the weighing conveyors 1 holding the objects, the control section 5 compares the weight value to a preset loading detected reference value (e.g., 6g), it determines that the corresponding weighing conveyor 1 holds the objects when the weight value is equal to or greater than the loading detected reference value, while it determines that the corresponding weighing conveyor 1 is not holding the objects when the weight value is less than the loading detected reference value. In the control section 5, the loading detected reference value is set and stored in the memory section 7.

When the control section 5 receives a discharge command signal from the subsequent-stage apparatus in step S1, the process goes to step S2. In step S2, the control section 5 performs the above stated combination process, to find a discharge combination. Then, in step S3, the control section 5 decides activation timings (conveying operation start timings) of the weighing conveyors 1 selected to make up the discharge combination, and an output timing of a discharge completion signal (timing at which the discharge completion signal is output). Then, in step S4, the control section 5 activates the weighing conveyors 1 based on the activation timings decided in step S3, activates the collecting conveyor 3, and outputs the discharge completion signal to the subsequent-stage apparatus based on the output timing decided in step S3. The above stated operation is repeated. When the weighing conveyors 1 and the collecting conveyor 3 are activated, the objects on the weighing conveyors 1 are discharged onto the collecting conveyor 3, which conveys the objects in the direction of the arrow c, and feeds them to the subsequent-stage apparatus.

The subsequent-stage apparatus is configured to output the discharge command signal at a predetermined timing to the combination weigher and start a predetermined operation upon reception of the discharge completion signal from the combination weigher. As the subsequent-stage apparatus, for example, there is placed a packaging machine of bag charging type in which the objects are charged into bags. Or, as the subsequent-stage apparatus, for example, there is placed a conveyor apparatus which intermittently and horizontally moves a plurality of trays (shallow boxes) joined to each other in an annular shape. In this case, the objects discharged from the collecting conveyor 3 are fed to each tray, and an operator who takes charge of the conveyor apparatus charges the objects put on each tray into one pack. In this case, for example, the conveyor apparatus outputs the discharge command signal to the combination weigher at a time point when the conveyor apparatus moves the tray and moves an empty tray to a discharge port (herein, immediately below a bottom discharge outlet 41a of the receiver funnel 41 as will be described later) of the collecting conveyor 3, moves the tray when a predetermined time passes after the discharge completion signal is received from the combination weigher, and moves a next empty tray to the discharge port of the collecting conveyor 3.

Figure 4:
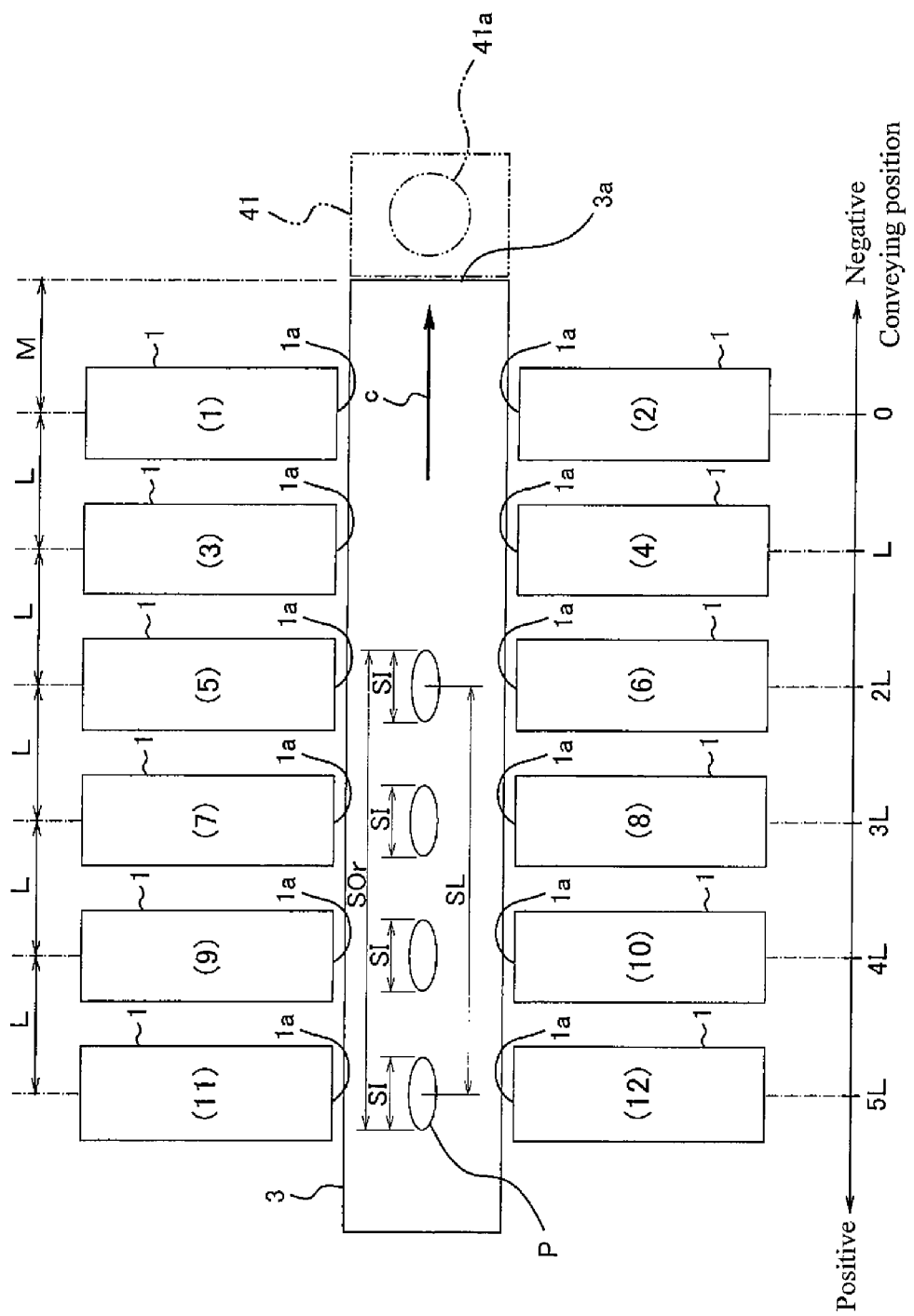
FIG. 4 is a schematic view showing a layout of weighing conveyors and a collecting conveyor in the exemplary combination weigher according to the embodiment of the present invention.

The subsequent-stage apparatus includes, for example, the receiver funnel 41 of FIG. 4 to receive the objects discharged from the collecting conveyor 3 into a bag (in the case of packaging machine) or a tray (in the case of conveyor apparatus). The receiver funnel 41 is placed in close proximity to a discharge end 3a of the collecting conveyor 3. The objects discharged from the discharge end 3a of the collecting conveyor 3 are fed into the bag or the tray through the bottom discharge outlet 41a of the receiver funnel 41. The receiver funnel 41 may be provided as a constituent of the combination weigher.

Next, a detailed operation of the combination weigher of the present embodiment will be described. Prior to describing the operation, terms and the like used in the present embodiment will be described with reference FIG. 4. FIG. 4 is a schematic view showing a layout of the weighing conveyors and the collecting conveyor in the exemplary combination weigher according to the embodiment.

As shown in FIG. 4, the weighing conveyors 1 are assigned with conveyor numbers in parenthesis sequentially in such a manner that the weighing conveyor 1 closer to the discharge end 3a of the collecting conveyor 3 is assigned with a smaller conveyor number. The conveyor numbers of the weighing conveyors 1 are stored in the memory section 7. Regarding the weighing conveyors 1 which are placed at the same position (the same position in the conveying direction of the collecting conveyor 3) with respect to the discharge end 3a of the collecting conveyor 3 and at opposed positions with respect to the collecting conveyor 3, one of these weighing conveyors 1 is assigned with a smaller number and the other is assigned with the following number. L indicates a center-to-center distance between the weighing conveyors 1 which are adjacent to each other in a lengthwise direction (conveying direction) of the collecting conveyor 3. M indicates a distance from the discharge end 3a of the collecting conveyor 3 to a center of the weighing conveyor 1 which is closest to the discharge end 3a of the collecting conveyor 3. In the example of FIG. 4, center positions of the weighing conveyors 1 of the conveyor numbers (1) and (2) are expressed as 0, and positions in the lengthwise direction of the collecting conveyor 3 are expressed as conveying positions. Each of the weighing conveyors 1 conveys the objects in a particular direction (direction of arrow a, arrow b in FIG. 1) toward the collecting conveyor 3 and discharges the objects from the discharge end 1a thereof to the collecting conveyor 3.

In the example of FIG. 4, for example, it is assumed that four weighing conveyors 1 of conveyor numbers (6), (8), (10), and (12) are selected to make up a discharge combination, and the objects P are discharged from these four weighing conveyors 1 at the same time. In this case, when a length (conveying length of objects, and hereinafter will be referred to as "string out length") from a head to a tail of the objects discharged from the four weighing conveyors 1 selected to make up the discharge combination and conveyed on the collecting conveyor 3 is SOr, a length (hereinafter will be referred to as "individual length") of the objects discharged from each weighing conveyor 1, which length is in the conveying direction on the collecting conveyor 3, is equal and SI, and a center-to-center distance (hereinafter will be referred to as "string length") between the objects at a head and the objects at a tail, which are conveyed on the collecting conveyor 3, is SL, $$SOr = SL + SI$$

That is, the string out length SOr is a sum of the string length SL and the individual length SI.

In the case where the objects are discharged from all of the weighing conveyors 1 selected to make up the discharge combination at the same time as described above, the string length SL tends to be sometimes different due to a variation in the weighing conveyors 1 selected to make up the discharge combination, because the string length SL is equal to a center-to-center distance between the weighing conveyor 1 which discharges the objects at the head and the weighing conveyor 1 which discharges the objects at the tail. Therefore, the string out length SOr is varied and cannot be maintained at a fixed length.

In the present embodiment, to attain a desired value of the string out length SOr, activation timings (start timings of conveying operation) of the weighing conveyors 1 selected to make up a discharge combination, when these weighing conveyors discharge the objects, are calculated, and the weighing conveyors 1 are caused to start conveying operation based on the calculated activation timings. Hereinafter, a first exemplary operation and a second exemplary operation, as an example of the detailed operation in step S3, will be described.

In the present embodiment, it is assumed that a position on which an operator puts the objects on each weighing conveyor 1 is, for example, a middle of the weighing conveyor 1 in the lengthwise direction of the weighing conveyor 1, which is defined in a manual or the like. In addition, it is assumed that conveying speeds of the weighing conveyors 1 are set equal, and times which take from when the weighing conveyors 1 are activated (start conveying operation) until the objects on those weighing conveyors 1 are discharged onto the collecting conveyor 3 are equal. Therefore, a relation among the discharge timings (discharge order and discharge time interval) at which the objects are discharged from the weighing conveyors 1 onto the collecting conveyor 3 is equal to a relation among activation timings (activation order and activation time interval) of the weighing conveyors 1.

First Exemplary Operation

Figure 5:
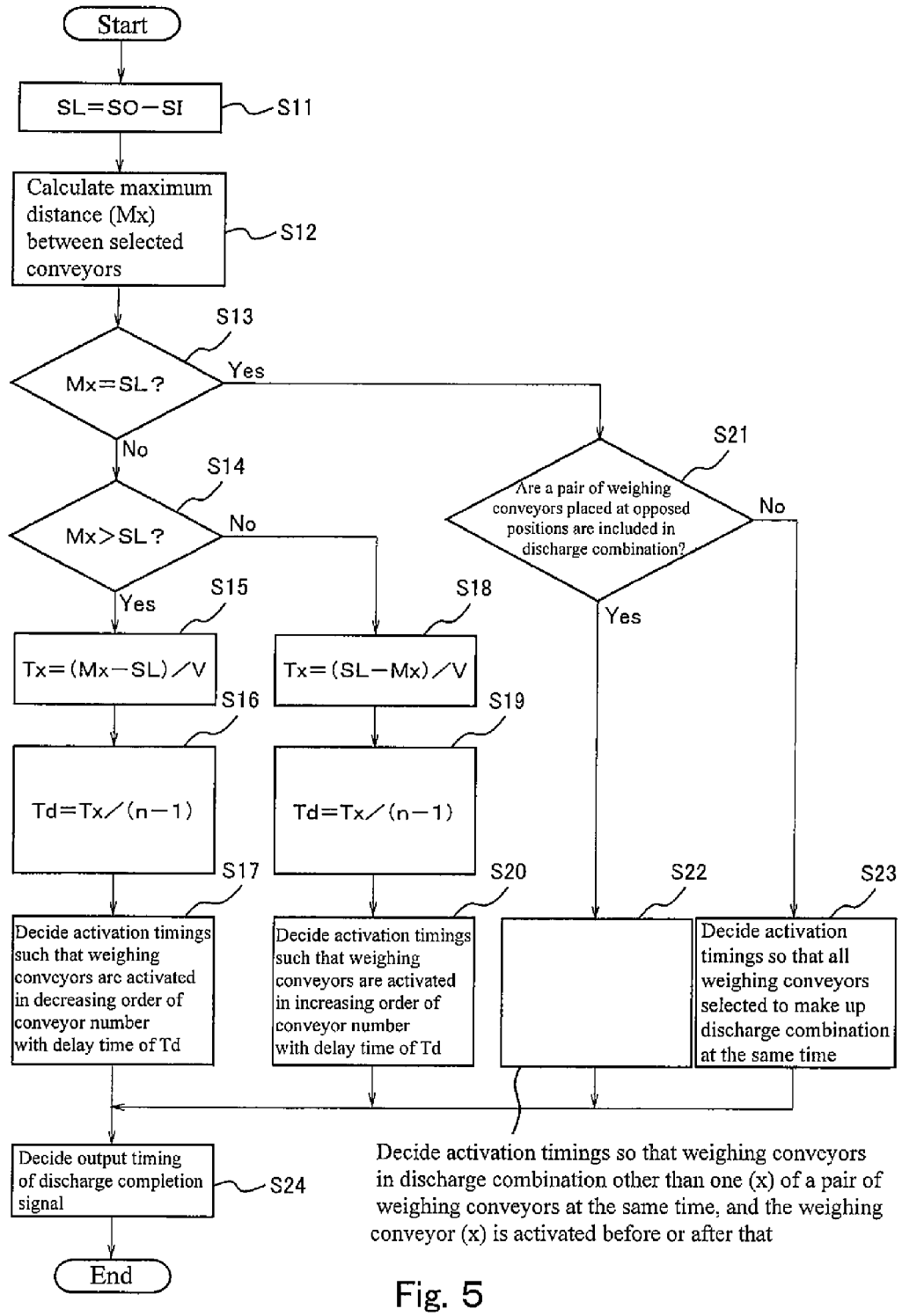
FIG. 5 is a flow chart showing a first exemplary operation of the exemplary combination weigher according to the embodiment of the present invention.

FIG. 5 is a flow chart showing a first exemplary operation of the exemplary combination weigher according to the embodiment. This is a flow chart showing an example of a detailed process in step S3 after the combination process (step S2) of FIG. 3. Herein, it is assumed that the number (the number of selection in the combination) of the weighing conveyors 1 selected to make up the discharge combination, as a result of the combination process in step S2 is n (n: plural number). Also, it is assumed that the conveying speed of the collecting conveyor 3 is V.

A desired string out set length SO and the individual length SI are input in advance to the control section 5, by using the manipulation setting display device 4. The values of the SO and SI are stored in the memory section 7. In addition, the value of the conveying speed V of the collecting conveyor 3, etc., are stored in the memory section 7.

In step S11, the string length SL is calculated by subtracting the individual length SI from the string out set length SO (SL=SO−SI). Once step S11 is performed, the resultant string length SL is stored. That is, step S11 need not be performed again. In next processing, the process may start from step S12.

In step S12, a center-to-center distance between the weighing conveyors 1 placed at both ends in the conveying direction of the collecting conveyor 3, among the weighing conveyors 1 selected to make up the discharge combination, i.e., a center-to-center distance (maximum distance between selected weighing conveyors) Mx between the weighing conveyor 1 of the smallest conveyor number and the weighing conveyor 1 of the largest conveyor number, among the weighing conveyors 1 selected to make up the discharge combination, is calculated. For example, the maximum distance Mx between selected weighing conveyors is found in such a manner that a center-to-center distance between arbitrary two weighing conveyors 1 is stored in the memory section 7 for all of the weighing conveyors 1, and a distance between desired two weighing conveyors 1 is read from the memory section 7. Or, the maximum distance Mx between selected weighing conveyors may be found in such a manner that the conveying positions of the centers of the weighing conveyors 1 of FIG. 4 are stored in the memory section 7, and a difference between the conveying positions of the centers of desired two weighing conveyors 1 is calculated.

To be more precise, the maximum distance Mx between selected weighing conveyors is a distance between a position (its center position) of the discharge end 1a of one of the two weighing conveyors 1 placed at both ends in the conveying direction of the collecting conveyor 3, and a position (its center position) of the discharge end 1a of the other of the two weighing conveyors 1, among the weighing conveyors 1 selected to make up the discharge combination.

In step S13, it is determined whether or not the maximum distance Mx between selected weighing conveyors is equal to the string length SL. If it is determined that the maximum distance Mx is equal to the string length SL, the process goes to step S21. On the other hand, if it is determined that the maximum distance Mx is not equal to the string length SL, the process goes to step S14.

In step S14, it is determined whether or not the maximum distance Mx between selected weighing conveyors is greater than the string length SL. If it is determined that the maximum distance Mx is greater than the string length SL, the process goes to step S15. On the other hand, if it is determined that the maximum distance Mx is not greater the string length SL, the process goes to step S18.

If it is determined that the maximum distance Mx between selected weighing conveyors is greater the string length SL, its difference (Mx−SL) is divided by the collecting conveyor conveying speed V, and its result is converted into time Tx, in order to reduce the string out length, (step S15). The time Tx is divided by (n−1) to derive delay time Td (step S16).

Then, in step S17, the activation timings of the weighing conveyors 1 selected to make up the discharge combination are decided so that the weighing conveyor 1 of the largest conveyor number is activated firstly, and then the weighing conveyors 1 are activated sequentially with the delay time Td in descending order of the conveyor number. That is, the weighing conveyors 1 are activated sequentially in such a way that the weighing conveyor 1 which is more distant from the discharge end 3a of the collecting conveyor 3 is activated earlier.

If a pair of weighing conveyors 1 placed at opposed positions are included in the discharge combination, for example, the activation timings of the weighing conveyors 1 are decided as follows, to prevent a situation in which the objects are discharged from these two weighing conveyors 1 placed at opposed positions at the same time. The activation timings of the two weighing conveyors 1 placed at opposed positions are set with a difference of L/2V so that the center-to-center distance between the objects discharged from these two weighing conveyors 1 on the collecting conveyor 3 becomes L/2.

For example, in a case where the weighing conveyor 1 of the largest conveyor number and the weighing conveyor 1 of the second largest conveyor number in the discharge combination are placed at opposed positions, the activation timings are decided as follows. One of the weighing conveyors 1 placed at opposed positions is activated firstly, the other weighing conveyor 1 is activated when L/2V passes after one of these weighing conveyors 1 is activated, and the weighing conveyor 1 of the third largest conveyor number is activated when 2Td passes after the other weighing conveyor 1 is activated. Thereafter, the weighing conveyors 1 are activated sequentially in descending order of the conveyor number at intervals of Td. In this case, in a case where four weighing conveyors 1, including the above stated pair of weighing conveyors 1 placed at opposed positions, are selected to make up the discharge combination, the last (fourth) weighing conveyor 1 is activated when (3Td+L/2V) passes after the first weighing conveyor 1 is activated, and the objects on this weighing conveyor 1 are objects at a head which are conveyed on the collecting conveyor 3. The objects at a tail which are conveyed on the collecting conveyor 3 are the objects on the weighing conveyor 1 activated secondly when L/2V passes after the first weighing conveyor 1 is activated. Therefore, since time that takes from when the objects at the tail are discharged until the objects at the head are discharged is 3Td, the string out length is shorter by 3Td·V than in a case where the objects are discharged from all of the weighing conveyors 1 making up the discharge combination at the same time, and becomes the string out set length SO.

In a case where the weighing conveyor 1 of the smallest conveyor number and the weighing conveyor 1 of the second smallest conveyor number in the discharge combination are placed at opposed positions, the activation timings are decided so that the weighing conveyors 1, other than the weighing conveyor 1 of the smallest conveyor number and the weighing conveyor 1 of the second smallest conveyor number, are activated sequentially in descending order of the conveyor number at intervals of Td. In this case, since n weighing conveyors 1 are selected to make up the discharge combination, the pair of weighing conveyors 1 placed at opposed positions are activated (n−1)-thly and n-thly. The weighing conveyor 1 activated (n−2)-thly is activated when Td×(n−3) passes after the first weighing conveyor 1 is activated. The weighing conveyor 1 activated (n−1)-thly, of the pair of weighing conveyors 1 placed at opposed positions, is activated when Td×(n−1) passes after the first weighing conveyor 1 is activated. The weighing conveyor 1 activated n-thly, of the pair of weighing conveyors 1 placed at opposed positions, is activated when Td×(n−1)+L/2V passes after the first weighing conveyor 1 is activated. In this case, the objects of the weighing conveyor 1 activated (n−1)-thly, which is the last but one in the order, are the objects at the head conveyed on the collecting conveyor 3, and the objects of the weighing conveyor 1 activated n-thly, are the second objects conveyed on the collecting conveyor 3. Therefore, since time that takes from when the objects at the tail are discharged until the objects at the head are discharged is Td×(n−1), a string out length is shorter by Td×(n−1)V than in case where the objects are discharged from all of the weighing conveyors 1 making up the discharge combination at the time, and becomes the string out set length SO.

In a case where a pair of weighing conveyors 1 placed at opposed positions and between the weighing conveyor 1 of the largest conveyor number and the weighing conveyor 1 of the smallest conveyor number in the discharge combination, are included in the discharge combination, the activation timings are decided as in the case where the weighing conveyor 1 of the smallest conveyor number and the weighing conveyor 1 of the second smallest conveyor number in the discharge combination are placed at opposed positions. In this case, for example, in a case where four weighing conveyors 1 are selected to make up the discharge combination, and a pair of weighing conveyor 1 of the second largest conveyor number and the weighing conveyor 1 of the third largest conveyor number in the discharge combination, are placed at opposed positions, the weighing conveyor 1 of the largest conveyor number is activated firstly, one of the pair of weighing conveyors 1 placed at opposed positions is activated when 2Td passes after the weighing conveyor 1 of the largest conveyor number is activated, the other weighing conveyor 1 is activated when L/2V passes after one of the pair of weighing conveyors 1 is activated, and the last weighing conveyor 1 of the fourth largest conveyor number is activated when 3Td passes after the first weighing conveyor 1 is activated.

On the other hand, if it is determined that the maximum distance Mx between selected weighing conveyors is smaller than the string length SL (No in step S14), its difference (SL−Mx) is divided by the collecting conveyor conveying speed V, and its result is converted into time Tx, to increase the string out length (step S18). The time Tx is divided by (n−1) to derive delay time Td (step S19).

Then, in step S20, the activation timings of the weighing conveyors 1 selected to make up the discharge combination are decided so that the weighing conveyor 1 of the smallest conveyor number is activated firstly, and then the weighing conveyors 1 are activated sequentially with the delay time Td in ascending order of the conveyor number.

If it is determined that the maximum distance Mx between selected weighing conveyors is equal to the string length SL (Yes in step S13), it is determined whether or not a pair of weighing conveyors 1 placed at opposed positions are included in the weighing conveyors 1 selected to make up the discharge combination (step S21). If it is determined that a pair of weighing conveyors 1 placed at opposed positions are not included in the weighing conveyors 1 selected to make up the discharge combination, the activation timings are decided so that all of the weighing conveyors 1 selected to make up the discharge combination are activated at the same time (step S23).

If it is determined that a pair of weighing conveyors 1 placed at opposed positions are included in the discharge combination, in step S21, the process goes to step S22.

In step S22, in a case where the weighing conveyor 1 of the largest conveyor number and the weighing conveyor 1 of the second largest conveyor number in the discharge combination are placed at opposed positions, the activation timings of the weighing conveyors 1 are decided so that one of the weighing numbers 1 is activated, and then the remaining weighing conveyors 1 are activated at the same time when L/2V passes after one of the weighing numbers 1 is activated. In other cases, the activation timings of the weighing conveyors 1 are decided so that the weighing conveyors 1 selected to make up the discharge combination except for one of a pair of weighing conveyors 1 placed at opposed positions and making up the discharge combination, and the collecting conveyor 3, are activated at the same time, and then the one of the weighing conveyors 1 is activated when L/2V passes.

In step S17, step S20, and step S22, the activation timings of the weighing conveyors 1 are decided so that a center-to-center distance between the objects at the head and the objects at the tail, which are discharged from the weighing conveyors 1 selected to make up the discharge combination and conveyed on the collecting conveyor 3 becomes the string length SL calculated from the string out set length SO and the center positions of the objects discharged from the discharge conveyor 1 do not overlap with each other on the collecting conveyor 3.

Then, in step S24, an output timing of a discharge completion signal to be output to the subsequent-stage apparatus is decided. This output timing is decided based on the conveying position of the discharge end 1a of the weighing conveyor 1 which discharges the objects at the tail which are conveyed on the collecting conveyor 3 (i.e., distance between the discharge end 1a of the weighing conveyor 1 and the discharge end 3a of the collecting conveyor 3 in the conveying direction of the collecting conveyor 3). The output timing is decided so that time that takes from when the discharge completion signal is output until the objects at the tail reaches the discharge end 3a of the collecting conveyor 3, is equal, whichever of the weighing conveyors 1 discharges the objects at the tail.

For example, in a case where the objects discharged from the weighing conveyor 1 of the conveyor number (11) or (12) which is most distant from the discharge end 3a of the collecting conveyor 3 and in which the conveying position of the center of the discharge end 1a, is 5 L, are the objects at the tail, a time point when a predetermined time Tz passes after that weighing conveyor 1 which discharges the objects at the tail is activated, is predetermined as the output timing of the discharge completion signal. The predetermined time Tz is determined as a predetermined value which is not less than zero and not more than time that takes from when the weighing conveyor 1 of the conveyor number (11) or (12) is activated until the objects put on that weighing conveyor 1 are discharged from the discharge end 3a of the collecting conveyor 3.

In a case where the objects discharged from the weighing conveyor 1 of the conveyor number (9) or (10) in which the conveying position of the center of the discharge end 1a, is 4 L, are the objects at the tail, a time point when (Tz−L/V) passes after that weighing conveyor 1 which discharges the objects at the tail is activated, is found as the output timing of the discharge completion signal. In the same manner, in a case where the objects discharged from the weighing conveyor 1 of the conveyor number (7) or (8) are the objects at the tail, a time point when (Tz−2 L/V) passes after that weighing conveyor 1 which discharges the objects at the tail is activated, is found as the output timing of the discharge completion signal. Or, in a case where the objects discharged from the weighing conveyor 1 of the conveyor number (5) or (6) are the objects at the tail, a time point when (Tz−3 L/V) passes after that weighing conveyor 1 which discharges the objects at the tail is activated, is found as the output timing of the discharge completion signal. Or, in a case where the objects discharged from the weighing conveyor 1 of the conveyor number (3) or (4) are the objects at the tail, a time point when (Tz−4 L/V) passes after that weighing conveyor 1 which discharges the objects at the tail is activated, is found as the output timing of the discharge completion signal. Or, in a case where the objects discharged from the weighing conveyor 1 of the conveyor number (1) or (2) are the objects at the tail, a time point when (Tz−5 L/V) passes after that weighing conveyor 1 which discharges the objects at the tail is activated, is found as the output timing of the discharge completion signal. The output timings of the discharge completion signals may be pre-stored in the memory section 7.

In step S4 (FIG. 3), the weighing conveyors 1 selected to make up the discharge combination are activated based on the activation timings decided as described above, for a first predetermined time, and the collecting conveyor 3 is activated for a second predetermined time. The collecting conveyor 3 is activated at the same time that the weighing conveyor 1 is activated firstly. Then, the discharge completion signal is output to the subsequent-stage apparatus at the output timing decided in step S24.

In the first exemplary operation, the string out length satisfies the string out set length SO, and it becomes possible to prevent a situation in which the center positions of the objects discharged from the weighing conveyors 1 do not overlap with each other on the collecting conveyor 3. That is, since the objects can be discharged from the collecting conveyor 3 in a state in which the objects corresponding to one weighing conveyor 1 are suitably apart from the objects corresponding to another weighing conveyor 1 and these objects are not lumped together, it becomes possible to prevent a situation in which the objects get stuck in the receiver inlet (e.g., receiver funnel 41) of the objects in the subsequent-stage apparatus.

In the first exemplary operation, in the case where the pair of weighing conveyors 1 placed at opposed positions are included in the discharge combination, the activation timings of these two weighing conveyors 1 are set with the difference L/2V between them. If the individual length SI is long and therefore the objects discharged from the weighing conveyors 1 overlap with each other irrespective of setting of the difference of L/2V, the activation timings of the weighing conveyors 1 may be decided in view of the individual length SI so that the objects discharged from the weighing conveyors 1 do not overlap with each other on the collecting conveyor 3.

Second Exemplary Operation

Figure 6:
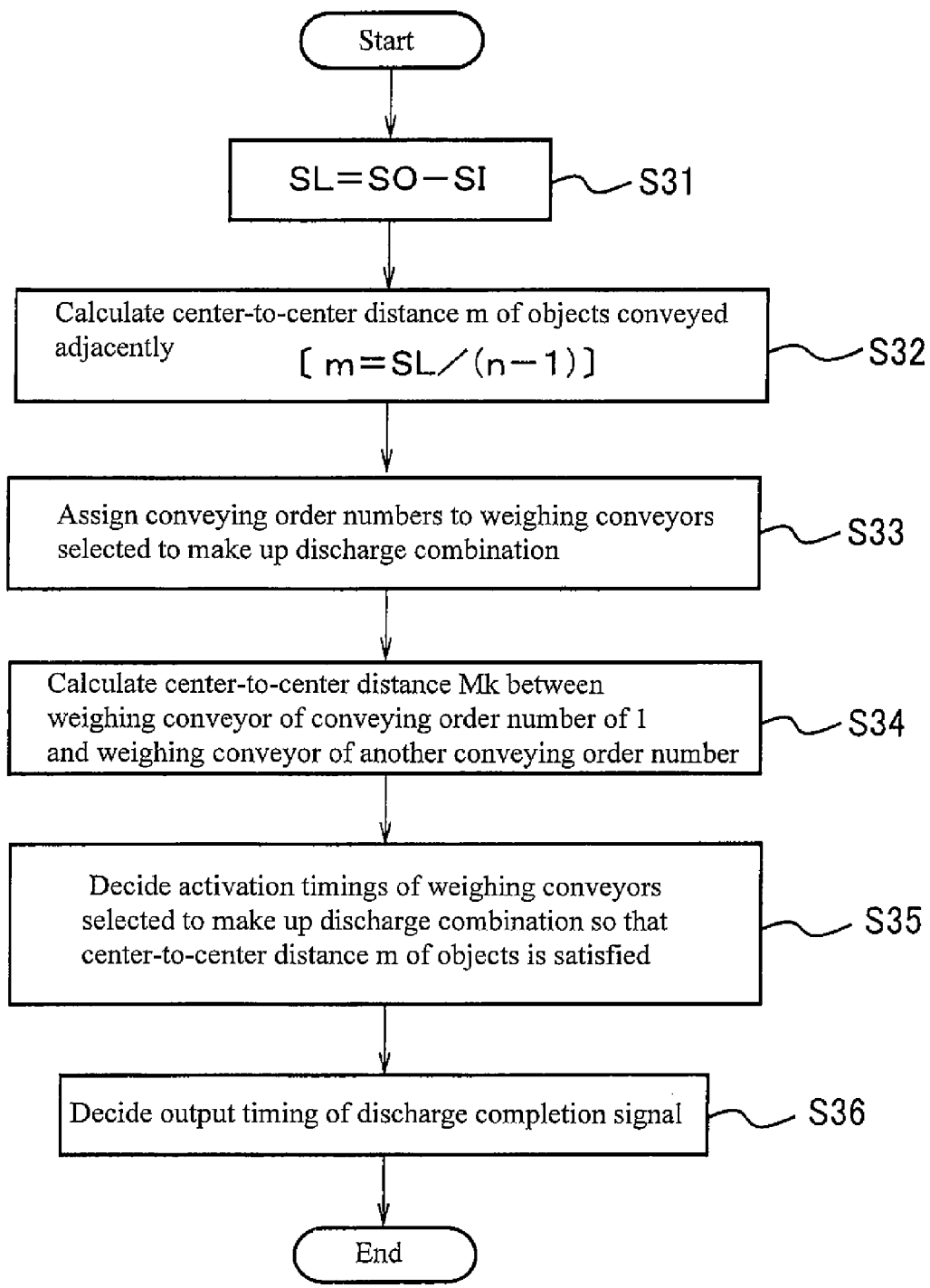
FIG. 6 is a flow chart showing a second exemplary operation of the exemplary combination weigher according to the embodiment of the present invention.

FIG. 6 is a flow chart showing a second exemplary operation of the exemplary combination weigher according to the embodiment. This is a flow chart showing an example of the detailed process in step S3 after the combination process (step S2) of FIG. 3. Herein, it is assumed that the number (the number of selection in the combination) of the weighing conveyors 1 selected to make up the discharge combination, as a result of the combination process in step S2 is n (n is plural number). Also, it is assumed that the conveying speed of the collecting conveyor 3 is V.

Like the first exemplary operation, the desired string out length SO and the individual length SI are input in advance to the control section 5, by using the manipulation setting display device 4. The values of SO and SI are stored in the memory section 7. In addition, the value of the collecting conveyor conveying speed V, etc., are stored in the memory section 7.

The second exemplary operation is an example in which when the objects discharged from the weighing conveyors 1 making up the discharge combination are conveyed on the collecting conveyor 3, the centers of the objects are arranged at uniform intervals (m) within the string out set length SO. To this end, a center-to-center distance m between the objects which are conveyed adjacently to each other on the collecting conveyor 3, is calculated from the string length SL corresponding to the string out set length SO, and the number of selection in the combination n, start timings (activation timings) of the conveying operation which is the discharge operation of the weighing conveyors 1 are found to realize the center-to-center distance m, and the weighing conveyors 1 are activated at the found activation timings. Hereinafter, this will be described in detail.

In step S31, the string length SL is calculated by subtracting the individual length SI from the string out set length SO (SL=SO−SI). Once step S31 is performed once, the resultant string length SL is stored. That is, step S31 need not be performed again. In next processing, the process may start from step S32.

In step S32, the center-to-center distance m between the objects which are conveyed adjacently to each other on the collecting conveyor 3, is calculated from the string length SL and the number of selection combination n, using a formula:

$$m = SL/(n-1)$$

Then, in step S33, the weighing conveyors 1 selected to make up the discharge combination are assigned with conveying order numbers which are 1, 2, ..., n in ascending order of the conveyor number. The conveying order numbers represent the order in which the objects discharged from the weighing conveyors 1 are arranged on the collecting conveyor 3 while the objects are conveyed thereon. The conveying order number of the weighing conveyor 1 which discharges the objects conveyed at the head on the collecting conveyor 3 is "1."

Then, in step S34, a center-to-center distance $M_k$ between the weighing conveyor 1 of the conveying order number 1 and the weighing conveyor 1 of the conveying order number k (k=2, 3, ..., n) is calculated.

For example, in a case where three weighing conveyors 1 of the conveyor numbers (1), (2), and (7) of FIG. 4, are selected to make up the discharge combination, the weighing conveyors 1 of the conveyor numbers (1), (2), and (7) are assigned with the conveying order numbers 1, 2, and 3, respectively (step S33). A center-to-center distance $M_2$ between weighing conveyors 1 is a center-to-center distance between the weighing conveyor 1 of the conveying order number 2 (conveyor number (2)) and the weighing conveyor 1 of the conveying order number 1 (conveyor number (1)). In this case, $M_2$=0. A center-to-center distance $M_3$ between weighing conveyors 1 is a center-to-center distance between the weighing conveyor 1 of the conveying order number 3 (conveyor number (7)) and the weighing conveyor 1 of the conveying order number 1 (conveyor number (1)). In this case, $M_2=3$ L The center-to-center distance $M_k$ between weighing conveyors 1 is found in such a way that a center-to-center distance between arbitrary two weighing conveyors 1, is stored in the memory section 7, for all of the weighing conveyors 1, and a center-to-center distance between desired two weighing conveyors 2 is read from the memory section 7. Or, the center-to-center distance $M_k$ between weighing conveyors 1 may be found in such a way that the conveying positions of the centers of the weighing conveyors 1 of FIG. 4 are stored in the memory section 7, and a difference between the conveying positions of the centers of the desired two weighing conveyors 2 is calculated. For example, the conveying position of the center of the weighing conveyor 1 of the conveyor number (1) and the conveying position of the center of the weighing conveyor 1 of the conveyor number (2) are "0", while the conveying position of the center of the weighing conveyor 1 of the conveyor number (7) is "3 L."

To be precise, the center-to-center distance $M_k$ between weighing conveyors 1 is a distance between the position (its center position) of the discharge end 1a of the weighing conveyor 1 of the conveying order number 1 and the position (its center position) of the discharge end 1a of the weighing conveyor 1 of the conveying order number k.

Then, in step S35, the activation timings of the weighing conveyors 1 selected to make up the discharge combination are decided so that a center-to-center distance between the objects which are conveyed adjacently to each other on the collecting conveyor 3, becomes the center-to-center distance m calculated in step S32. A method of deciding the activation timings will be described below in detail.

Now, discharge timings at which the objects are discharged from the weighing conveyors 1 to the collecting conveyor 3 will be described.

Initially, on the basis of discharge time t1 of the weighing conveyor 1 of the conveying order number 1, discharge time tk (k=2, 3, ..., n) of another weighing conveyor 1 is calculated.

When a center-to-center distance between the objects discharged from the weighing conveyor 1 of the conveying order number k and the objects discharged from the weighing conveyor 1 of the conveying order number 1, on the collecting conveyor 3, is $A_k$, Ak=(k−1)m to realize the center-to-center distance m between the objects which are conveyed adjacently to each other on the collecting conveyor 3, as calculated previously.

The center-to-center distance between the weighing conveyor 1 of the conveying order number k and the weighing conveyor 1 of the conveying order number 1 is, as described above, $M_k$.

Here, it is assumed that the center-to-center distance $M_k$ between the weighing conveyors 1 is shorter than the center-to-center distance $A_k$ of the objects. In this case, by retarding the discharge timing of the weighing conveyor 1 of the conveying order number k with respect to the weighing conveyor 1 of the conveying order number 1, by a value obtained by dividing a difference between the center-to-center distance $M_k$ and the center-to-center distance $A_k$, by the collecting conveyor conveying speed V, i.e., $(A_k-M_k)/V$, the center-to-center distance of the objects discharged from these weighing conveyors 1 becomes $A_k$. On the other hand, it is assumed that the center-to-center distance $M_k$ between the weighing conveyors 1 is longer than the center-to-center distance $A_k$ of the objects. In this case, by advancing the discharge timing of the weighing conveyor 1 of the conveying order number k with respect to the weighing conveyor 1 of the conveying order number 1, by a value of $-(A_k-M_k)/V$, the center-to-center distance of the objects discharged from these weighing conveyors 1 becomes $A_k$.

That is, by setting time which is a sum of the discharge time of the weighing conveyor 1 of the conveying order number 1 and time of $(A_k-M_k)/V$, as the discharge time of the weighing conveyor 1 of the conveying order number k, irrespective of a magnitude relationship between the center-to-center distance $M_k$ between the weighing conveyors 1 and the center-to-center distance $A_k$ of the objects, the center-to-center distance of the objects discharged from these weighing conveyors 1 becomes $A_k$. As described above, $A_k=(k-1)m$.

Therefore, on the basis of discharge time t1 (t1 is an arbitrary value and may be 0) of the weighing conveyor 1 of the conveying order number 1, discharge time tk (k=2, 3, ..., n) of the weighing conveyor 1 of the conveying order number k is calculated using the following formula (I):

$$tk=t1+[(k-1)m-M_k]/V \quad (I)$$

For example, in a case where three weighing conveyors 1 of the conveyor numbers (1), (2), and (7) of FIG. 4, are selected to make up the discharge combination, like the above case, the discharge time t2 of the weighing conveyor 1 of the conveying order number 2 (conveyor number (2)) is k=2, and $M_2=0$, and therefore, $$t2=t1+m/V$$

This time t2 is later by m/V than the discharge time t1 of the weighing conveyor 1 of the conveying order number 1 (conveyor number (1)).

The discharge time t3 of the weighing conveyor 1 of the conveying order number 3 (conveyor number (7)) is k=3, and $M_3=3$ L, and therefore, $$t3=t1+(2m-3L)/V$$

This time t3 is later by (2 m−3 L)/V than the discharge time t1 of the weighing conveyor 1 of the conveying order number 1 in the case where (2m−3 L) is a positive value, while this time t3 is earlier by −(2 m−3 L)/V than the discharge time t1 of the weighing conveyor 1 of the conveying order number 1 in the case where (2 m−3 L) is a negative value.

Assuming that the string out set length SO=2 L+SI, SL=2 L, and the number of selection in the combination n=3, $$m=SL/(n-1)=2L/(3-1)=L.$$

Since m=L, the above stated t2 and t3 are as follows:

$$t2=t1+m/V=t1+L/V$$

$$t3=t1+(2m-3L)/V=t1-L/V$$

In ascending order of the values of the discharge time t1, the discharge time t2, and the discharge time t3 calculated in the above described manner, the discharge order of the corresponding weighing conveyors 1 is decided. Then, the discharge time interval between the weighing conveyors 1 is calculated as will be described later.

For example, t1=0, t2=L/V, and t3=−L/V

When these values are arranged in ascending order, this results in t3, t1, and t2. In other words, the discharge order of the objects of the weighing conveyors 1 is in the order of conveying order number 3, conveying order number 1, and conveying order number 2. Then, the discharge time interval between the weighing conveyor 1 of the conveying order number 3 and the weighing conveyor 1 of the conveying order number 1 is calculated as t1−t3=L/V, while the discharge time interval between the weighing conveyor 1 of the conveying order number 1 and the weighing conveyor 1 of the conveying order number 2 is calculated as t2−t1=L/V.

That is, the objects are firstly discharged from the weighing conveyor 1 of the conveying order number 3 (conveyor number (7)), then the objects are discharged from the weighing conveyor 1 of the conveying order number 1 (conveyor number (1)) when time of L/V passes after the objects are discharged from the weighing conveyor 1 of the conveying order number 3, and then the objects are discharged from the weighing conveyor 1 of the conveying order number 2 (conveyor number (2)) when time of L/V passes after the objects are discharged from the weighing conveyor 1 of the conveying order number 1.

Instead of calculating the discharge time interval as described above, delay time with respect to the weighing conveyor 1 which firstly discharges the objects may be calculated. Specifically, delay time of the weighing conveyor 1 of the conveying order number 1 with respect to the weighing conveyor 1 of the conveying order number 3 which firstly discharges the objects may be calculated as t1−t3=L/V, and delay time of the weighing conveyor 1 of the conveying order number 2 with respect to the weighing conveyor 1 of the conveying order number 3 may be calculated as t2−t3=2 L/V.

A description will be given of an example in a case where the objects are discharged based on the discharge timings (discharge order and discharge time interval) found as described above.

With reference to the conveying positions of FIG. 4, the objects are discharged from the weighing conveyor 1 of the conveyor number (7) to the conveying position 3 L. Then, when time of L/V passes, the objects are discharged from the weighing conveyor 1 of the conveyor number (1) to the conveying position 0. At this time, the objects discharged from the weighing conveyor 1 of the conveyor number (7) has moved by a distance of V×L/V=L in the direction of the arrow c, and therefore its conveying position is 2 L. Therefore, the center-to-center distance between the objects discharged from the weighing conveyor 1 of the conveyor number (7) and the objects discharged from the weighing conveyor 1 of the conveyor number (1) is 2 L. Then, when time of L/V passes, the objects are discharged from the weighing conveyor 1 of the conveyor number (2) to the conveying position 0. At this time, the objects discharged from the weighing conveyor 1 of the conveyor number (7) has moved from the position 2 L by a distance of V×L/V=L in the direction of the arrow c, and therefore its conveying position is L. In the same manner, the conveying position of the objects discharged from the weighing conveyor 1 of the conveyor number (1) is −L.

Therefore, the center-to-center distance between the objects discharged from the weighing conveyor 1 of the conveyor number (7) and the objects discharged from the weighing conveyor 1 of the conveyor number (2) is L. Also, the center-to-center distance between the objects discharged from the weighing conveyor 1 of the conveyor number (1) and the objects discharged from the weighing conveyor 1 of the conveyor number (2) is L.

That is, the center-to-center distance between the objects at the head and the objects at the tail is 2 L, and the siring out length is 2 L+SI, which satisfies the string out set length SO. And, the objects discharged from the weighing conveyors 1 are conveyed at uniform intervals (center-to-center distance of the objects is m and uniform) on the collecting conveyor 3.

In the above description, the method of finding the discharge timings of the weighing conveyors 1 has been explained. As described above, since the relation among the discharge timings (discharge order and discharge time interval) of the weighing conveyors 1 is equal to the relation among the activation timings (activation order and activation time interval) of the weighing conveyors 1, the method of finding the discharge timings can be employed as the method of finding the activation timings of the weighing conveyors 1. Specifically, contents indicated by the reference symbols in the above stated formula (I) are changed in such a way that t1 indicates the activation time of the weighing conveyor 1 of the conveying order number 1 (t1 is an arbitrary value, and is, for example, 0), tk indicates the activation time of the weighing conveyor 1 of conveying order number k, and the activation tk is calculated. Further, based on a result of the calculation, the activation order and activation time interval of the weighing conveyors 1 may be found as in the case where the discharge order and the discharge time interval are found. Instead of finding the activation time interval, delay times of the activation timings of the weighing conveyors 1 other than the weighing conveyor 1 which is activated firstly, with respect to the weighing conveyor 1 which is activated firstly, may be found.

Then, in step S36, an output timing of a discharge completion signal to be output to the subsequent-stage apparatus is decided. This output timing is, as in the case of step S24 of FIG. 5, decided based on the conveying position of the discharge end 1a of the weighing conveyor 1 which discharges the objects conveyed at the tail on the collecting conveyor 3 (i.e., distance between the discharge end 1a of the weighing conveyor 1 and the discharge end 3a of the collecting conveyor 3 in the conveying direction of the collecting conveyor 3), and so that time that takes from when the discharge completion signal is output until the objects at the tail reaches the discharge end 3a of the collecting conveyor 3, is equal, whichever of the weighing conveyors 1 discharges the objects at the tail.

Then, in step S4 (FIG. 3), the weighing conveyors 1 selected to make up the discharge combination are activated based on the activation timings decided as described above, for a first predetermined time, and the collecting conveyor 3 is activated for a second predetermined time. The collecting conveyor 3 is activated at the same time that the weighing conveyor 1 is activated firstly. Then, the discharge completion signal is output to the subsequent-stage apparatus at the output timing decided in step S36.

In the second exemplary operation, the string out length satisfies the string out set length SO. Also, the objects discharged from the weighing conveyors 1 are conveyed by the collecting conveyor 3 such that their centers are arranged at uniform intervals (center-to-center distance of the objects conveyed adjacently to each other is m and uniform) on the collecting conveyor 3. That is, since the objects can be discharged from the collecting conveyor 3 in a state in which the centers of the objects are suitably apart at uniform intervals (distances) and the objects are not lumped together, it becomes possible to prevent a situation in which the objects get stuck in the receiver inlet (e.g., receiver funnel 41) of the objects in the subsequent-stage apparatus.

In the second exemplary operation, in the case where the individual length SI is long, the number of weighing conveyors 1 selected to make up the discharge combination is decided as N (N: plural) irrespective of the individual length SI, or the number of weighing conveyors 1 selected to make up the discharge combination is always equal to or less than N irrespective of the individual length SI, the string out set length SO is set to a value equal to SI×N, or a value which is a little greater than SI×N (SO≧SI×N). This allows the objects discharged from the weighing conveyors 1 to be conveyed on the collecting conveyor 3 while preventing the objects discharged from the weighing conveyors 1 do not overlap with each other.

In the first exemplary operation and the second exemplary operation, in view of the distance between the discharge end 1a of the weighing conveyor 1 which discharges the objects at the tail on the collecting conveyor 3 and the discharge end 3a of the collecting conveyor 3, the output timing at which the discharge completion signal is output to the subsequent-stage apparatus is decided so that time that takes from when the discharge completion signal is output until the objects at the tail reaches the discharge end 3a of the collecting conveyor 3, is equal, whichever of the weighing conveyors 1 discharges the objects at the tail. The subsequent-stage apparatus placed at the discharge end 3a side of the collecting conveyor 3 moves an empty bag or an empty tray to a location immediately under the receiver funnel 41, outputs the discharge command signal to the combination weigher, and in this state, awaits reception of the discharge completion signal from the combination weigher. Based on the timing at which the discharge completion signal is input to the subsequent-stage apparatus, the subsequent-stage apparatus sends out the bag or tray fed with the objects from the collecting conveyor 3, and moves a next empty bag or a next empty tray to the location immediately under the receiver funnel 41. Thus, the subsequent-stage apparatus starts a next operation based on the timing at which the discharge completion signal is input to the subsequent-stage apparatus. Therefore, by deciding the output timing of the discharge completion signal from the combination weigher so that time that takes from when the discharge completion signal is output until the objects at the tail reaches the discharge end 3a of the collecting conveyor 3, is equal, whichever of the weighing conveyors 1 discharges the objects at the tail, the subsequent-stage apparatus is enabled to start a next operation as soon as the objects at the tail discharged from the collecting conveyor 3 are changed into the bag or the tray. As a result, productivity can be improved.

Although the weighing conveyors 1 are used in the plurality of weighing units Cw1 to Cw12 for weighing the objects, and the objects discharged from one ends of the weighing conveyors 1 are collected on the collecting conveyor 3 and discharged to the subsequent-stage apparatus, a height (level) difference between the weighing conveyors 1 and the collecting conveyor 3 can be reduced, and an impact generated when the objects discharged from the weighing conveyors 1 selected to make up the discharge combination are transferred onto the collecting conveyor 3 can be lessened. Because of this, the objects which are broken or damaged easily, due to an impact or the like generated when they are dropped, can be weighed without causing damages to them.

In the present embodiment, since the weighing conveyors 1 are placed at both sides of the collecting conveyor 3, the length of the collecting conveyor 3 can be reduced, and the discharge time of the objects can be reduced. In addition, the combination weigher can be made compact, and the operator can easily carry out the work for feeding the objects. Since the operator has only to put the objects on the weighing conveyor 1 in the work for feeding the objects, even an inexperienced operator can feed the objects more easily than in a case where the objects are fed to the hoppers in the conventional combination weigher. The weighing conveyors 1 may be placed only at one side of the collecting conveyor 3. However, in that case, the length of the collecting conveyor 3 for placing a predetermine number of weighing conveyors 1 increases, and the discharge time of the objects increases. In view of this, preferably, the weighing conveyors 1 are placed at both sides of the collecting conveyor 3.

Since the trough-type belt conveyor in which the center portion of the conveying surface is concave is used as the collecting conveyor 3, the objects discharged from the weighing conveyors 1 placed at both sides of the collecting conveyor 3 can be collected to the center portion and discharged to the subsequent-stage apparatus. Thus, feeding of the objects to the subsequent-stage apparatus can be performed accurately.

Although in the present embodiment, the combination process in step S2 is performed upon reception of the discharge command signal from the subsequent-stage apparatus, the present invention is not limited to this. For example, the combination process in step S2 may be performed at preset intervals, then step S3 may be performed, and step S4 may be performed and the objects may be discharged to the subsequent-stage apparatus, upon reception of the discharge command signal. The time required for the combination process is about 10 ms. Therefore, even when the combination process or the like in step S3 and step S4 is initiated after reception of the discharge command signal, like the present embodiment, an actual weighing cycle is not substantially affected. The combination weigher is preferably configured to initiate the combination process after reception of the discharge command signal like the present embodiment, because the number of weight values used in the combination calculation can be increased, and the combination weighing accuracy can be improved.

The collecting conveyor 3 may be configured to be activated all the time. A motor for activating the conveyor does not consume electric power in a deactivated state, and unnecessary electric power is consumed to activate the motor. Therefore, it is desirable to activate the collecting conveyor 3 such that electric power consumption is less as a whole.

Although in the present embodiment, the driving motor 1M is mounted to the lower surface of the conveyor frame 1F of the weighing conveyor 1, and the weight sensor 2 supports the weighing conveyor 1 including the driving motor 1M, the weight sensor 2 may support the weighing conveyor 1 except for the driving motor 1M. In this case, the driving motor 1M is mounted to a member which is not supported on the weight sensor 2. For example, a coupling mechanism for coupling the driving motor 1M to a driving roller of the weighing conveyor 1 is configured in such a manner that the rotational power of the driving motor 1M is transmitted to the driving roller of the weighing conveyor 1 only when the weighing conveyor 1 is activated (objects are conveyed), and the driving motor 1M is physically separated from the driving roller of the weighing conveyor 1 when the weighing conveyor 1 is deactivated (objects are not conveyed), to prevent a load caused by the driving motor 1M from being exerted on the weight sensor 2. And, the weight sensor 2 measures the weight of the objects on the weighing conveyor 1 when the weighing conveyor 1 is deactivated. The above configuration may be used.

The method of deciding the activation timings of the weighing conveyors 1 of the present embodiment may be applied to start timings of discharge operation of hoppers (objects holding units) in a combination weigher including the hoppers. For example, this method may be applied to a combination weigher in which the plurality of weighing conveyors 1 and the plurality of weight sensors 2 are replaced by a plurality of hoppers aligned in one line or two lines in the conveying direction (direction of the arrow c) above the collecting conveyor 3 and placed at predetermined positions, a combination (discharge combination) of hoppers holding objects in which a total weight falls within a target weight range, is found, the objects are discharged from the hoppers selected to make up the discharge combination, and the collecting conveyor 3 conveys the discharged objects. The hoppers have discharge gates, hold the objects fed from above for a specified time, and discharge the objects by opening and closing the discharge gates which are discharge ports. In this case, start timings of discharge operation of the hoppers, i.e., start timings of opening/closing operation of the discharge gates can be found as in the case where the activation timings of the weighing conveyors 1 are found as described above. Feeding of the objects to the hoppers may be performed automatically or manually by the operator. The hoppers may be supported by the weight sensors which measure the weights of the objects. Or, second hoppers for feeding the objects to the hoppers may be provided above the hoppers and may be supported by the weight sensors which measure the weight of the objects fed to the hoppers. In the case where the second hoppers are provided, feeding of the objects to the second hoppers may be performed automatically or manually by the operator.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

INDUSTRIAL APPLICABILITY

The present invention is useful as a combination weigher or the like, which is able to discharge objects such that the objects are suitably apart and are not lumped together to prevent a situation in which the objects get stuck in a receiver port of the objects in a subsequent-stage apparatus.

REFERENCE SIGNS LIST 1 weighing conveyor
1a discharge end of weighing conveyor
2 weight sensor
3 collecting conveyor
4 manipulation setting display device
5 control section

The invention claimed is:

1. A combination weigher comprising:
a collecting conveyor which conveys objects fed thereto at a predetermined speed in one direction and discharges the objects;
a plurality of object holding units which hold the objects fed thereto for a specified time, then discharge the objects from discharge ports and feeds the objects to the collecting conveyor in an activated state in which the objects are conveyed, in which the discharge ports are placed at predetermined positions in a conveying direction of the collecting conveyor;
a combination unit which repeatedly performs a combination process for finding one discharge combination including a combination of the object holding units holding the objects in which a total weight of the objects falls within a target weight range;
an input unit which pre-inputs a desired value of a conveying length of the objects which is a length from the objects at a head to the objects at a tail in a state in which the objects discharged from the object holding units selected to make up the discharge combination are conveyed by the collecting conveyor;
a processor unit which every time the discharge combination is found in the combination process, finds start timings of discharge operation of the objects of the object holding units selected to make up the discharge combination based on the positions of the discharge ports of the object holding units selected to make up the discharge combination and the conveying speed of the collecting conveyor such that the conveying length of the objects becomes the desired value pre-input by the input unit and the objects discharged from the discharge ports of the object holding units selected to make up the discharge combination are at different positions on the collecting conveyor, when the objects are conveyed by the collecting conveyor; and
a control unit which causes the object holding units selected to make up the discharge combination to start the discharge operation of the objects based on the start timings of the discharge operation found by the processor unit.

2. The combination weigher according to claim 1, wherein the processor unit finds the start timings of the discharge operation of the objects of the object holding units selected to make up the discharge combination such that the conveying length of the objects becomes the desired value pre-input by the input unit, and the objects discharged from the discharge ports of the object holding units selected to make up the discharge combination are placed with their centers being arranged at uniform intervals on the collecting conveyor, when the objects are conveyed by the collecting conveyor.

3. A combination weigher comprising:
a collecting conveyor which conveys objects fed thereto at a predetermined speed in one direction and discharges the objects;
a plurality of weighing conveyors which are fed with the objects manually in a deactivated state in which the objects are not conveyed, convey the objects, discharge the objects from discharge ends thereof and feed the objects to the collecting conveyor in an activated state in which the objects are conveyed, in which the discharge ends are placed at predetermined positions in a conveying direction of the collecting conveyor;
a plurality of weight sensors provided to correspond to the weighing conveyors, respectively, to measure weights of the objects held on the weighing conveyors;
a combination unit which repeatedly performs a combination process for finding one discharge combination including a combination of the weighing conveyors holding the objects in which a total weight of the objects falls within a target weight range;
an input unit which pre-inputs a desired value of a conveying length of the objects which is a length from the objects at a head to the objects at a tail in a state in which the objects discharged from the weighing conveyors selected to make up the discharge combination are conveyed by the collecting conveyor;
a processor unit which every time the discharge combination is found in the combination process, finds start timings of conveying operation of the weighing conveyors selected to make up the discharge combination based on the positions of the discharge ends of the weighing conveyors selected to make up the discharge combination and the conveying speed of the collecting conveyor such that the conveying length of the objects becomes the desired value pre-input by the input unit and the objects discharged from the discharge ends of the weighing conveyors selected to make up the discharge combination are at different positions on the collecting conveyor, when the objects are conveyed by the collecting conveyor; and a weighing conveyor control unit which causes the weighing conveyors selected to make up the discharge combination to start the conveying operation based on the start timings of the conveying operation found by the processor unit.

4. The combination weigher according to claim 3,
wherein the processor unit finds the start timings of the conveying operation of the weighing conveyors selected to make up the discharge combination such that the conveying length of the objects becomes the desired value pre-input by the input unit and the objects discharged from the discharge ends of the weighing conveyors selected to make up the discharge combination are placed with their centers being arranged at uniform intervals on the collecting conveyor, when the objects are conveyed by the collecting conveyor.

5. The combination weigher according to claim 4,
wherein the processor unit calculates a value of the uniform intervals based on the desired value pre-input by the input unit and the number of the weighing conveyors selected to make up the discharge combination found by the combination unit.

6. The combination weigher according to claim 3,
wherein the plurality of weighing conveyors constitute first and second weighing conveyor groups which are placed such that the collecting conveyor is interposed between the first and second weighing conveyor groups;
wherein the weighing conveyors in each of the first and second weighing conveyor groups are arranged in parallel; and
wherein the weighing conveyors in each of the first and second weighing conveyor groups are placed such that the collecting conveyor is placed at the discharge end side of the weighing conveyors and a conveying direction of the weighing conveyors is perpendicular to the conveying direction of the collecting conveyor.

7. The combination weigher according to claim 4,
wherein the plurality of weighing conveyors constitute first and second weighing conveyor groups which are placed such that the collecting conveyor is interposed between the first and second weighing conveyor groups;
wherein the weighing conveyors in each of the first and second weighing conveyor groups are arranged in parallel; and
wherein the weighing conveyors in each of the first and second weighing conveyor groups are placed such that the collecting conveyor is placed at the discharge end side of the weighing conveyors and a conveying direction of the weighing conveyors is perpendicular to the conveying direction of the collecting conveyor.

8. The combination weigher according to claim 5,
wherein the plurality of weighing conveyors constitute first and second weighing conveyor groups which are placed such that the collecting conveyor is interposed between the first and second weighing conveyor groups;
wherein the weighing conveyors in each of the first and second weighing conveyor groups are arranged in parallel; and
wherein the weighing conveyors in each of the first and second weighing conveyor groups are placed such that the collecting conveyor is placed at the discharge end side of the weighing conveyors and a conveying direction of the weighing conveyors is perpendicular to the conveying direction of the collecting conveyor.

* * * * *